Sept. 15, 1970   G. F. NELSON   3,529,247

PULSE REPETITION TO ANALOG VOLTAGE CONVERTER

Filed Sept. 20, 1967

George F. Nelson,
INVENTOR.

BY

United States Patent Office 3,529,247
Patented Sept. 15, 1970

3,529,247
PULSE REPETITION TO ANALOG VOLTAGE CONVERTER
George F. Nelson, Anoka, Minn., assignor, by mesne assignments, to the United States of America as represented by the Secretary of the Army
Filed Sept. 20, 1967, Ser. No. 669,318
Int. Cl. H03k 9/06, 5/20
U.S. Cl. 328—140                                    3 Claims

ABSTRACT OF THE DISCLOSURE

An electronic converter having a free-running ramp generator, a source of non-random pulses having a variable repetition rate, means connecting the pulse source to the generator whereby each pulse resets the generator, and means converting the output of the generator to an analog voltage which varies linearly with the repetition rate of the input pulses.

BACKGROUND OF THE INVENTION

This invention lies in the field of electronic converters. In particular, this invention is for a device which detects changes in the repetition rate of a continuous train of electrical signals and produces an analog output voltage representative of the repetition rate.

There is a need for a device, simple in design, having a good response time that can accurately produce an analog voltage which is representative of the repetition rate of a train of pulses. There is also a need for a device that will enable recording of the change in repetition rate or a visual indication of the change in repetition rate. The instant invention fulfills these needs.

SUMMARY OF THE INVENTION

This invention is an electronic converter for translating pulse frequency modulated information into an analog output representative of the input repetition rate. To accomplish this, the input pulse train is used indirectly to reset a free-running ramp generator. Thus, the amplitude of the ramp generator's output wave form becomes a function of the repetition rate of the input. The output of the ramp generator is fed into a peak detector which produces an output analog voltage. This analog voltage is a function of the output of the ramp generator and thus, the repetition rate of the input pulse train.

DESCRIPTION OF THE PREFERRED EMBODIMENT

Figure 1:
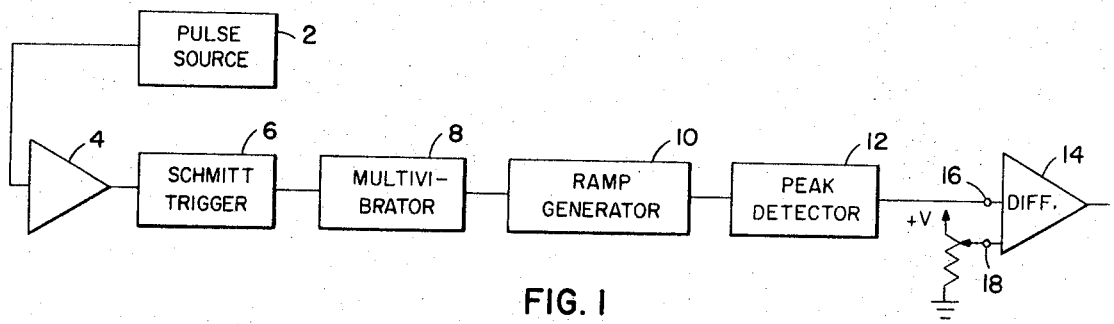
FIG. 1 is a block diagram of the present invention.
Figure 2:
FIG. 2 shows an input pulse train, varying in repetition frequency.
Figure 3:
FIG. 3 shows the resulting wave form at the output of the monostable multivibrator of FIG. 1.
Figure 4:
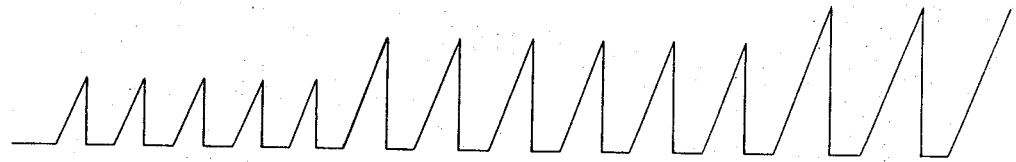
FIG. 4 shows the resulting wave form at the output of the free-running ramp generator of FIG. 1.
Figure 5:
FIG. 5 shows the analog voltage output of an electronic converter according to the present invention.

Referring to FIG. 1 of the drawing, a non-random pulse source 2 supplies a continuous non-random train of pulses (FIG. 2) to amplifier 4. The output of the electronic converter will be representative of the pulse repetition frequency of this train of pulses. An amplifier stage 4 is used to raise the signal level to about 600 millivolts to fire a Schmitt trigger 6. The Schmitt trigger's output keys a monostable multivibrator 8. The purpose of the Schmitt trigger and the monostable multivibrator is to standardize the input pulses in amplitude and width. Signals produced from the monostable multivibrator (FIG. 3) are used to reset a free-running ramp generator 10. A ramp generator, as used in this invention, is a generator which produces an output voltage which varies linearly with time. The output of the ramp generator, shown in FIG. 4, is fed to peak detector 12. Peak detector 12 is a device which detects the amplitude of the ramp peaks and produces an analog output voltage (FIG. 5) which varies according to the amplitude of the peak. Accordingly, the output voltage varies linearly with the input repetition rate. The voltage is applied to differential amplifier 14 at input 16. Another voltage is applied to differential amplifier 14 at input 18. The differential amplifier's output is a function of the difference between the two voltages at its two inputs 16 and 18. For a given repetition rate, a given voltage will exist at input 16. If the voltage at input 18 is adjusted to equal the voltage at input 16, the output of the differential amplifier will be zero. Using this approach, any output voltage from the differential amplifier will be indicative of a change in repetition rate. This output may be fed into a voltmeter for a visual indication or a recorder for a permanent record of the change in repetition rate indicated by the output voltage. Similarly, the voltage at input 18 could be adjusted to equal zero and then the output from differential amplifier 14 would be indicative of the repetition rate, not a change in repetition rate.

It will be apparent to those skilled in the art that changes may be made in the form of the apparatus disclosed without departing from the spirit of the invention as set forth in the appended claims, and that in some cases, certain features of the invention may sometimes be used to advantage without a corresponding use of the other features. Accordingly, the scope of this invention is to be limited only by the appended claims.

I claim:
1. A pulse repetition to analog voltage converter comprising: a free-running ramp generator; a source of pulses having a variable repetition rate; means for standardizing said pulses in amplitude and width connected between said pulse source and said generator, whereby each of said pulses resets said generator, said means for standardizing comprising an amplifier, a Schmitt trigger, and a monostable multivibrator connected in series, in the order recited; and means for converting the output of said generator to an analog voltage which varies linearly with the repetition rate of said pulses, said means for converting comprising a peak detector.
2. A pulse repetition to analog voltage converter as set forth in claim 1 further comprising a means to subtract a given level of D.C. voltage from said analog voltage.
3. A pulse repetition to analog voltage converter as set forth in claim 2 wherein said means for subtracting is a differential amplifier.

References Cited
UNITED STATES PATENTS

| | | | |
|---|---|---|---|
| 2,522,110 | 9/1950 | Forster | 329—107 |
| 3,074,015 | 1/1963 | Gerber | 328—140 XR |
| 3,099,800 | 7/1963 | Vinson et al. | 329—128 |
| 3,333,109 | 7/1967 | Updike | 307—233 X |

DONALD D. FORRER, Primary Examiner
S. D. MILLER, Assistant Examiner

U.S. Cl. X.R.
307—233, 271; 324—78; 329—107